(12) United States Patent
Levin et al.

(10) Patent No.: US 11,979,424 B2
(45) Date of Patent: May 7, 2024

(54) PROVIDING CONTEXTUAL FORENSIC DATA FOR USER ACTIVITY-RELATED SECURITY INCIDENTS

(71) Applicant: Twistlock, Ltd., Herzliya (IL)

(72) Inventors: Liron Levin, Herzliya (IL); Michael Kletselman, Tel Aviv (IL); Ami Bizamcher, Kiryat Ono (IL); Dima Stopel, Herzliya (IL); John Morello, Baton Rouge, LA (US)

(73) Assignee: Twistlock, Ltd., Herzliya (IL)

( * ) Notice: Subject to any disclaimer, the term of this patent is extended or adjusted under 35 U.S.C. 154(b) by 516 days.

(21) Appl. No.: 16/425,098

(22) Filed: May 29, 2019

(65) Prior Publication Data
US 2020/0382544 A1    Dec. 3, 2020

(51) Int. Cl.
*H04L 9/40*    (2022.01)
(52) U.S. Cl.
CPC ...... *H04L 63/1433* (2013.01); *H04L 63/1425* (2013.01)
(58) Field of Classification Search
CPC ............. H04L 63/1433; H04L 63/1425; H04L 2463/146; H04L 63/1416
USPC .......................................................... 726/25
See application file for complete search history.

(56) References Cited

U.S. PATENT DOCUMENTS

| | | | |
|---|---|---|---|
| 7,007,301 B2 | 2/2006 | Crosbie et al. | |
| 8,595,823 B2 | 11/2013 | Hayland et al. | |
| 8,819,822 B1 | 8/2014 | Pike et al. | |
| 10,218,741 B2 | 2/2019 | Gopalakrishna | |
| 10,542,013 B2* | 1/2020 | Ford | H04L 9/3236 |
| 10,645,096 B2* | 5/2020 | Ford | H04L 9/3236 |
| 2009/0313699 A1* | 12/2009 | Jang | G06F 21/52 726/23 |
| 2013/0254833 A1* | 9/2013 | Nicodemus | G06F 21/55 726/1 |
| 2015/0121522 A1* | 4/2015 | Guido | H04W 12/128 726/23 |

(Continued)

OTHER PUBLICATIONS

Invitation to Pay Additional Fees and, Where Applicable, Protest Fee and Annex to Form PCT/ISA/206, Communication Relating to the Results of the Partial International Search, PCT/IB2020/055084, dated Aug. 7, 2020, ISA/EPO, Rijswijk, The Netherlands.

(Continued)

*Primary Examiner* — Teshome Hailu
(74) *Attorney, Agent, or Firm* — Gilliam IP PLLC

(57) ABSTRACT

Techniques for providing contextual forensic data based on user activities. A first method includes identifying a user action in user activity data, wherein the user action is a discrete event initiated by a user, wherein the user action is performed with respect to a portion of a system; and correlating the identified user action with at least one system change, wherein the at least one system change is related to the portion of the system, wherein the at least one system change occurred after the user action. A second method includes taking a first snapshot before a user action occurs, wherein the user action is a discrete event initiated by a user, wherein the first snapshot is taken of at least a portion of a system; and taking a second snapshot after the user action occurs, wherein the second snapshot is taken of the at least a portion of the system.

20 Claims, 5 Drawing Sheets

(56) References Cited

U.S. PATENT DOCUMENTS

| | | | |
|---|---|---|---|
| 2015/0128266 A1* | 5/2015 | Tosa ..................... | G06F 21/566 |
| | | | 726/23 |
| 2015/0229651 A1* | 8/2015 | Nicodemus ......... | H04L 63/1433 |
| | | | 726/1 |
| 2017/0078309 A1 | 3/2017 | Allen et al. | |
| 2017/0223046 A1* | 8/2017 | Singh .................. | H04L 63/1491 |
| 2017/0272452 A1* | 9/2017 | Kraemer ............. | H04L 63/1416 |
| 2018/0198821 A1* | 7/2018 | Gopalakrishna .... | H04L 63/1416 |
| 2018/0248902 A1* | 8/2018 | Nil-Dumitrescu ....... | G06N 3/02 |
| 2018/0332066 A1* | 11/2018 | Moynahan .............. | H04L 63/14 |
| 2020/0314126 A1* | 10/2020 | Schmugar ............... | H04L 63/20 |

OTHER PUBLICATIONS

The International Search Report and The Written Opinion of the International Searching Authority for PCT/IB2020/055084, dated Oct. 28, 2020, ISA/EPO, Rijswijk, The Netherlands.

* cited by examiner

PROVIDING CONTEXTUAL FORENSIC DATA FOR USER ACTIVITY-RELATED SECURITY INCIDENTS

TECHNICAL FIELD

The present disclosure relates generally to forensic data used for cybersecurity, and more particularly to forensic data for incidents related to user activities.

BACKGROUND

Cybersecurity solutions attempt to identify and mitigate cyber-attacks by collecting data from systems, networks, devices, and so on. More data can lead to more accurate identifications of cyber-attacks. To this end, designers of cybersecurity solutions seek out new sources of data. However, with the large amount of activity generated in modern networks due to the presence of more systems, devices, inter-network connections, and the like, detecting cyber-attacks requires processing a large amount of data.

User activities can include a large amount of identifiable actions. However, raw data collected based on user activities do not provide the information needed by existing solutions to detect cyber-attacks.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing contextual forensic data based on user activities. The method comprises: identifying a user action in user activity data, wherein the user action is a discrete event initiated by a user, wherein the user action is performed with respect to a portion of a system; and correlating the identified user action with at least one system change, wherein the at least one system change is related to the portion of the system, wherein the at least one system change occurred after the user action.

Certain embodiments disclosed herein also include a system for providing contextual forensic data based on user activities. The system comprises: a processing circuitry; and a memory, the memory containing instructions that, when executed by the processing circuitry, configure the system to: identify a user action in user activity data, wherein the user action is a discrete event initiated by a user, wherein the user action is performed with respect to a portion of a system; and correlate the identified user action with at least one system change, wherein the at least one system change is related to the portion of the system, wherein the at least one system change occurred after the user action.

Certain embodiments disclosed herein include a method for advanced snapshotting based on user activities. The method comprises: taking a first snapshot before a user action occurs, wherein the user action is a discrete event initiated by a user, wherein the first snapshot is taken of at least a portion of a system; and taking a second snapshot after the user action occurs, wherein the second snapshot is taken of the at least a portion of the system.

Certain embodiments disclosed herein also include a system for advanced snapshotting based on user activities. The system comprises: a processing circuitry; and a memory, the memory containing instructions that, when executed by the processing circuitry, configure the system to: take a first snapshot before a user action occurs, wherein the user action is a discrete event initiated by a user, wherein the first snapshot is taken of at least a portion of a system; and take a second snapshot after the user action occurs, wherein the second snapshot is taken of the at least a portion of the system.

Certain embodiments disclosed herein include a method for providing contextual forensic data based on user activities. The method comprises: identifying a system change based on a detected vulnerability, wherein the detected vulnerability is a vulnerability in a portion of the system, wherein the system change is a change to the vulnerable portion of the system; and determining, based on the correlation between a plurality of user actions and a plurality of system changes, a user action of the plurality of user actions which caused the vulnerability, wherein each user action is a discrete event initiated by a user.

Certain embodiments disclosed herein also include a system for providing contextual forensic data based on user activities. The system comprises: a processing circuitry; and a memory, the memory containing instructions that, when executed by the processing circuitry, configure the system to: identify a system change based on a detected vulnerability, wherein the detected vulnerability is a vulnerability in a portion of the system, wherein the system change is a change to the vulnerable portion of the system; and determine, based on the correlation between a plurality of user actions and a plurality of system changes, a user action of the plurality of user actions which caused the vulnerability, wherein each user action is a discrete event initiated by a user.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
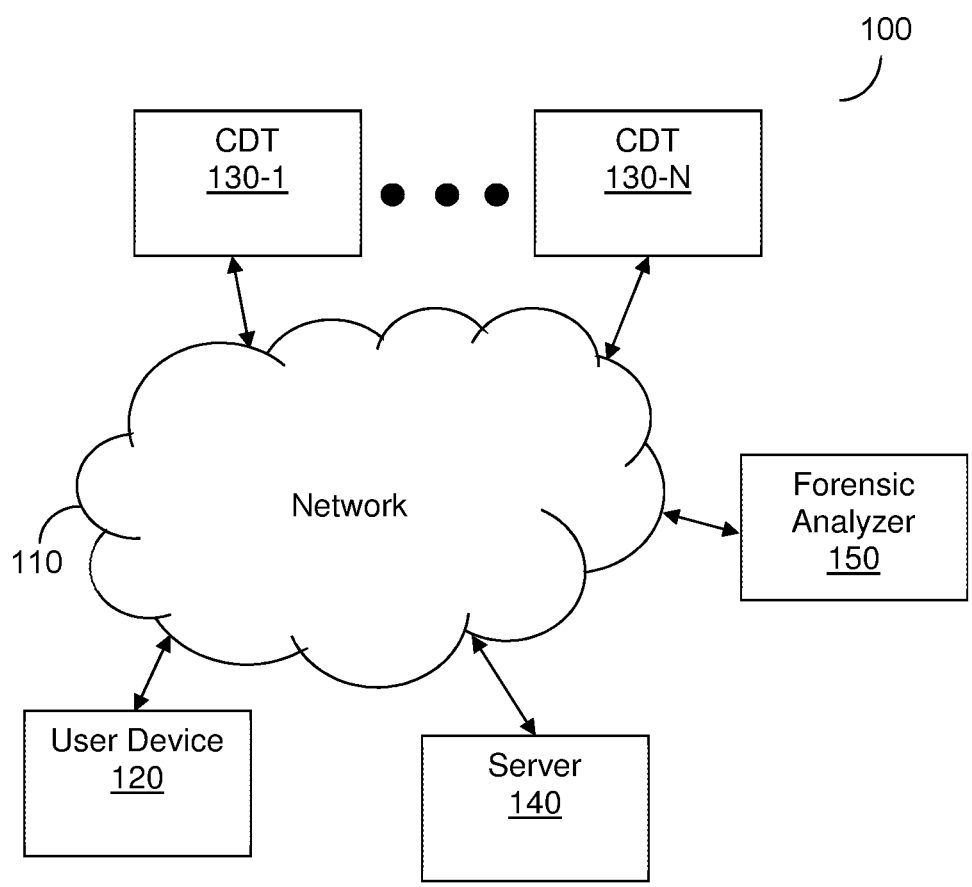
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for providing forensic data based on user activities. Techniques disclosed herein include techniques for correlating user actions with system changes, techniques for advanced system snapshots with respect to user activities, and techniques for correlating between software vulnerabilities and user activities.

In an embodiment, discrete user actions are correlated with system changes such as, for example, changes to a network firewall configuration on a server communicating with a user device. In particular, user actions are correlated with system changes caused by those user actions. It has been identified that some system changes can be attributed to preceding user actions. Thus, correlating these system changes to their respective user actions provides contextually enriched data that is more helpful for identifying root causes of subsequent cybersecurity issues.

In another embodiment, a snapshot is taken for a system before and after certain user actions. To this end, user actions are detected. Based on the detected user actions, it is determined when to take a snapshot. The snapshots are taken such that a detailed forensic investigation may be performed when a subsequent issue is detected. More specifically, snapshots are taken with respect to discrete user actions such that the user action which caused an issue may be identified based on how the system changed from before each user action to after each user action. By determining times for taking snapshots based on user actions rather than, for example, at predetermined time intervals, the amount of snapshots taken is minimized while maximizing the accuracy for forensic investigations. Additionally, the snapshots may be utilized to revert to a "good" configuration, for example when a vulnerability or misconfiguration is detected.

In yet another embodiment, software vulnerabilities are correlated with user activities to identify user actions that caused software vulnerabilities. This, in turn, allows for determining users that cause software vulnerabilities, durations of time for which systems are misconfigured, and the like. To this end, in a further embodiment, known vulnerabilities are scanned for. Vulnerabilities detected during the scanning are correlated with user activities.

Various disclosed embodiments may be utilized in combination to provide synergistic benefits. For example, when a software vulnerability is detected, the detected vulnerability may be correlated with a user action based on snapshots taken as described herein. In particular, the vulnerability may be correlated to a snapshot taken at a time that is closest in proximity and prior to the time at which the vulnerability was detected. Thus, such combination allows for identifying, based on this temporal correlation, the user action which caused the software vulnerability. As another example, based on correlations between system changes and user actions that caused the system changes, a user action which caused a subsequent vulnerability issue may be determined by identifying a user action correlated to a system change that preceded a software vulnerability.

The forensic data provided according to the disclosed embodiments may be provided to cybersecurity systems in order to prompt appropriate mitigation actions. In at least some embodiments, the forensic data is utilized to determine and perform mitigation actions. To this end, the disclosed embodiments provide techniques for generating such forensic data based on raw user activity data by aggregating and correlating such raw user activity data. Additionally, the snapshots provided according to at least some disclosed embodiments are more precise (i.e., preserving a lower amount of required data) while allowing for detailed forensic investigations.

FIG. 1 shows an example network diagram 100 utilized to describe the various disclosed embodiments. In the example network diagram 100, a user device 120, cybersecurity detection tools 130-1 through 130-N (hereinafter referred to individually as a cybersecurity detection tool 130 and collectively as cybersecurity detection tools 130, merely for simplicity purposes), a server 140, and a forensic analyzer 150 communicate via a network 110.

The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving user inputs and taking actions with respect to the server 140 such as, but not limited to, downloading files, uploading files, modifying files, and the like. The user device 120 therefore performs user actions with respect to the server 140 in response to such user inputs.

The cybersecurity detection tools 130 collect data related to cybersecurity issues. In particular, the cybersecurity detection tools are configured to detect software vulnerabilities or other misconfigurations of systems including the server 140.

The server 140 is a system which may be affected by user activities. Such effects may include, but are not limited to, sending files to the user device 120, storing files from the user device 120, having files modified by the user device 120, combinations thereof, and the like.

The forensic analyzer 150 is configured to provide contextual forensic data based on user activities as described herein with respect to one or more embodiments. To this end, the forensic analyzer 150 is configured to collect or receive data indicating user activities, changes to the server 140, both, and the like. Based on the collected data, the forensic analyzer 150 is configured to generate contextual forensic data, to cause the server 140 to take snapshots, or both.

It should be noted that a server 140 is depicted in FIG. 1 merely for example purposes, and that other systems may be equally utilized without departing from the scope of the disclosure. Any system that may be affected by user activities, either locally (e.g., via direct wired or wireless connection) or remotely (e.g. via one or more networks), may be utilized in accordance with the disclosed embodiments in order to provide forensic data for that system based on user activities. In some implementations, such a system may be affected by user actions directly, i.e., by receiving user inputs.

It should also be noted that the forensic analyzer 150 is depicted as a separate system from the server 140 merely for simplicity purposes, and that the forensic analyzer 150 may be included or otherwise integrated in the server 140 without departing from the scope of the disclosure. In an example implementation, the forensic analyzer 150 may be implemented as software included in the server 140 that is also configured to control system changes such as, for example, by allowing system changes only once snapshots have been taken.

Figure 2:
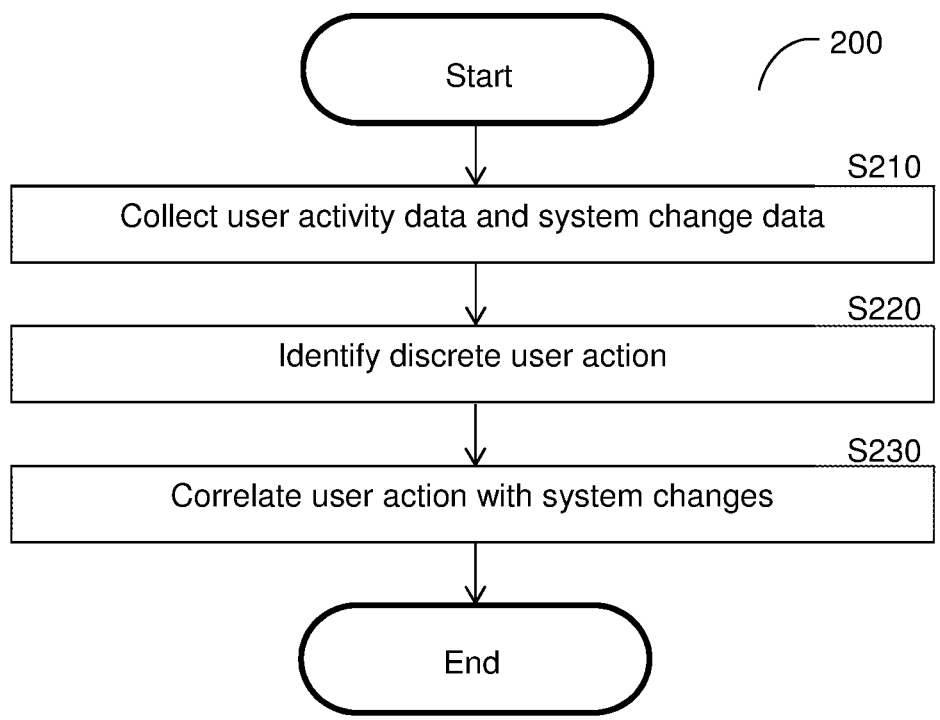
FIG. 2 is a flowchart illustrating a method for providing forensic data based on user activities and system changes according to an embodiment.

FIG. 2 is an example flowchart 200 illustrating a method for providing forensic data based on user activities and system changes according to an embodiment. In an embodiment, the method is performed by the forensic analyzer 150.

At S210, user activity data and system change data are collected. In an embodiment, the user activity data may be collected from a user device (e.g., the user device 120) and the system change data may be collected from a system which may be affected by user activities (e.g., the server 140). Alternatively, the user activity data and system change data may be collected from the same device, for example when the user device is the system being affected by the user activities.

At S220, a user action is identified among the user activity data. The identified user action is a discrete event initiated by a user (e.g., a user of the user device 120) and indicated by the user activity data. In some implementations, the user action may be identified based on the user activity data and a predetermined list of user actions, types of user actions, or both.

In an embodiment, S220 further includes tracking sequences of processes in order to identify user actions that started each sequence. To this end, connections among system activities may be established. This may include tracking child processes that are spawned off of other processes in order to establish the connections. The sequences may be contextualized in order to identify the user action as the beginning of one of the sequences, and the sequences may be updated as new user activities occur so as to reduce the need for using computing resources to re-process entire sequences.

At S230, the identified user action is correlated with one or more system changes indicated in the system change data. The correlated system changes include system changes that followed the user action (e.g., within a threshold period of time or prior to the next user action) and relate to the portion of the system affected by the user action.

The correlations may be stored as a record of user activities. The correlated system changes may include low-level constructs (e.g., modifications of system configuration), high-level constructs (e.g., service update, query repository, modify configuration, etc.), or both.

As a non-limiting example for the method of FIG. 2, when a user runs a command "apt-get update," the command produces multiple low-level actions such as downloading and modifying files. The user action of running the command "apt-get update" is correlated with the file downloads and file changes for updating Docker are further correlated to a high-level construct of system restart. The correlation results in the following record of user activities:

1. User x updated the system by running apt-get update
    A. Service Apache was updated from repository ppa.x (40 file changes, 1 file deleted)
    B. Service Docker was updated from repository ppa.y (service was also restarted)

As another non-limiting example for the method of FIG. 2, when a user "x" runs a command "apt-get install -y apache," the command produces multiple low-level actions such as downloading files and modifying existing configuration files. The user action of running the command "apt-get install -y apache" is correlated with the file downloads. The correlation results in the following record of user activities:

1. User x installed Apache by running apt-get install -y apache
    A. Service Apache was installed by user x (40 files were added, 5 binaries and 35 configuration files)
    B. Service cron was updated (a new script was added)

Figure 3:
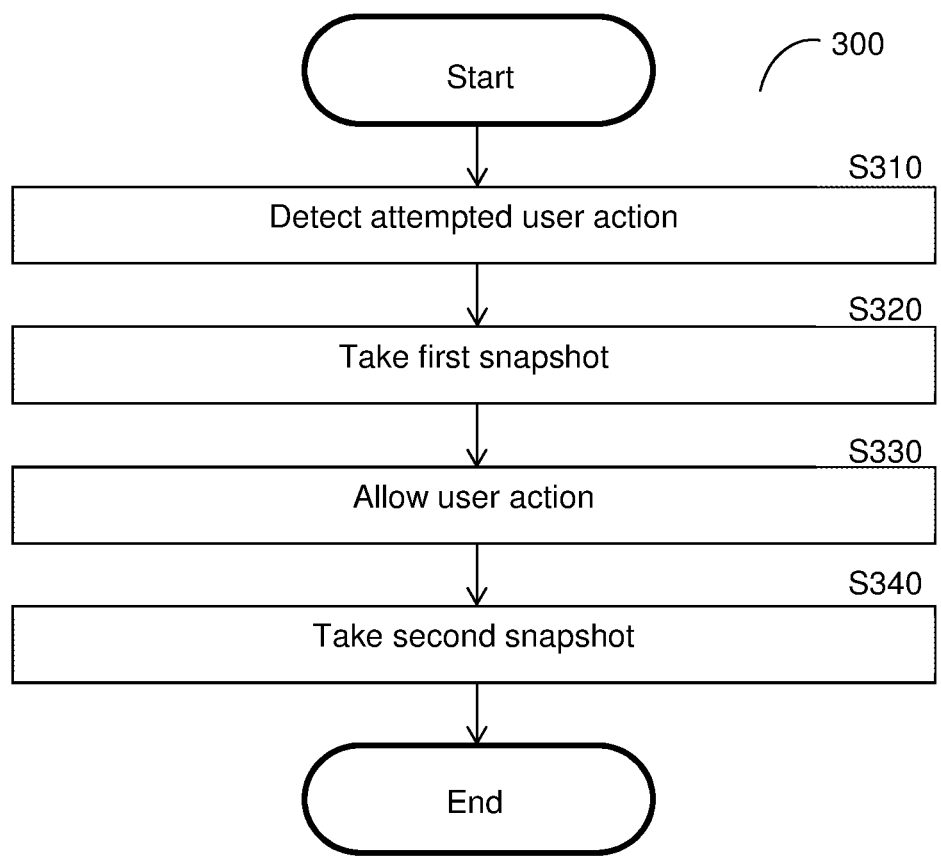
FIG. 3 is a flowchart illustrating a method for taking snapshots based on user activities according to an embodiment.

FIG. 3 is an example flowchart 300 illustrating a method for taking snapshots based on user activities according to an embodiment. In an embodiment, the method is performed by the forensic analyzer 150.

At S310, an attempted user action is detected. The user action is a discrete user activity that may cause changes to a system (e.g., the server 140). In an embodiment, the discrete user action may be detected based on user activity data collected from a user device (e.g., the user device 120) and a predetermined list of known user actions. The list may be, for example, a list of user actions or types of user actions that are known to cause system changes. Alternatively, all discrete user activities may be detected.

At S320, a first snapshot is caused before the user action is taken. In an embodiment, the attempted user action may only be allowed to proceed after the snapshot is successfully taken.

In an embodiment, S320 is realized at least in part by installing a hook that catches all appropriate process points into the system such that attempts to change the system by user action may be delayed until a snapshot can be taken. To this end, certain user actions to be delayed may be pre-defined—if the hook catches a user action other than one of the actions to be delayed, that user action may be allowed to continue unimpeded. The user actions to be delayed may be predefined or may be user actions related to predefined "important" portions of the system such as, but not limited to, system configuration.

In an embodiment, the snapshot may be of only a portion of a system. The portion of the system may be, for example, a portion of a system known to be modified as a result of the detected attempted user action. In some implementations, the predetermined list of known user actions may further include associations between the known user actions and known system changes caused by those user actions. As a non-limiting example, when a user action is running an iptables command that is associated with changes to configuration of the system's firewall, the snapshot may be a snapshot of the current state of the configuration rather than of the entire system. Selectively snapshotting portions of systems allows for further precision with respect to snapshots, thereby further reducing the amount of data used for storing snapshots.

At S330, the user action is allowed to be taken. In some implementations, S330 may include granting permission or authorization with respect to a portion of a system, one or more actions, a combination thereof, and the like.

At S340, a second snapshot is caused after the user action is completed. When the first snapshot is of a portion of a system, the second snapshot may be of the same portion of the system.

As a non-limiting example for the method of FIG. 3, a user attempt to modify system configuration by running an iptables command "-I INPUT -s 198.51.100.0 -j DROP" is detected. A first snapshot is taken of the current iptables state. After the first snapshot is taken, the iptables command is allowed to proceed. Once the iptables command is completed, a second snapshot is taken of the post-command iptables state.

As another non-limiting example for the method of FIG. 3, a user attempt to modify directory "/etc/hosts" is detected based on a user action that will open "/etc/hosts" with write permissions. A first snapshot of "/etc/hosts" is taken. Once the first snapshot is taken, the user is allowed to open "/etc/hosts" and to perform the modification. When "/etc/hosts" is subsequently closed, a second snapshot of "/etc/hosts" is taken.

Figure 4:
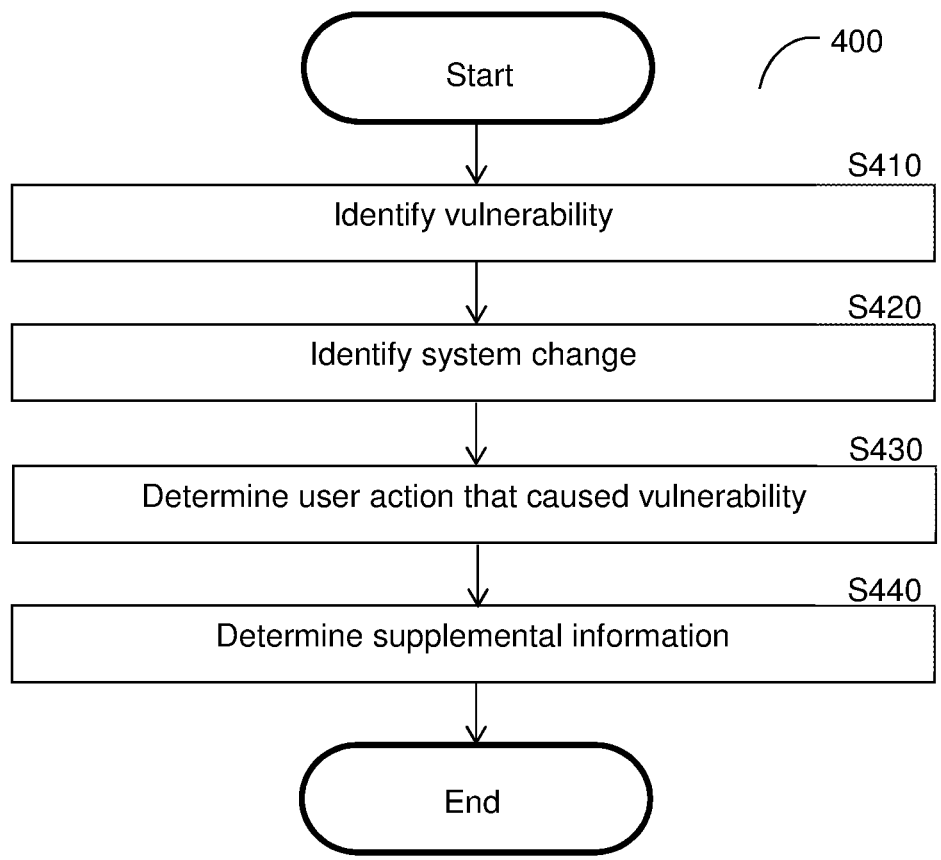
FIG. 4 is a flowchart illustrating a method for providing forensic data based on user activities and software vulnerabilities according to an embodiment.

FIG. 4 is an example flowchart 400 illustrating a method for providing forensic data based on user activities and software vulnerabilities according to an embodiment. In an embodiment, the method is performed by the forensic analyzer 150.

At S410, a vulnerability detection is identified. The vulnerability may be an actual vulnerability (e.g., a known vulnerability) or a potential vulnerability caused by, for example, a misconfiguration. The vulnerability is detected in a system that may be affected by user activities (e.g., the server 140 which may have files stored, deleted, or modified by the user device 120). In an embodiment, S410 includes detecting the vulnerability, for example when the system performing the method of FIG. 4 is also a cybersecurity detection system. In another embodiment, S420 includes receiving an event indicating the vulnerability from a cybersecurity detection tool. The detected vulnerability further indicates a portion of the system that is vulnerable.

In an embodiment, S410 may include scanning for known vulnerabilities. An example method for scanning for known vulnerabilities and, specifically, detecting vulnerable root certificates in software containers, is described further in U.S. patent application Ser. No. 15/434,757 assigned to the common assignee, the contents of which are hereby incorporated by reference.

At S420, based on the detected vulnerability, a system change is identified. The system change is a change related to the vulnerable portion of the system. To this end, in some implementations, the identified system change may be the closest temporally proximate potential cause of the vulnerability, i.e., the most recent system change to the vulnerable portion that occurred before the vulnerability was detected.

At S430, a user action that is the cause of the vulnerability is determined based on the identified system change.

In an embodiment, S430 includes analyzing correlations between user actions and system changes in order to determine the user action correlated to the identified system change. The user action correlated to the identified system change is determined as the cause of the vulnerability. The correlations may be correlations determined and recorded, for example, as described herein above with respect to FIG. 1. The correlations may be predetermined or may be determined in real-time during the performance of the method of FIG. 4.

At optional S440, supplemental information is determined based on the user action determined as the cause of the vulnerability. The supplemental information may include the user that caused the vulnerability (i.e., a user that performed the user action determined as the cause of the vulnerability), a time period for which the vulnerability was present (i.e., an amount of time between the time at which the user action occurred and the time at which the vulnerability was detected), or both.

As a non-limiting example for the method of FIG. 4, when a vulnerability is detected in Apache, the most recent change to Apache is identified as an installation of Apache. It is determined that a user action of running the command "apt-get install" on a server resulted in the installation of Apache and, therefore, is determined as the cause of the vulnerability.

As another non-limiting example for the method of FIG. 4, when a misconfiguration in the form of weak settings is detected in Apache, the most recent change to Apache is identified as a modification to the configuration of Apache. It is determined that a user action of running the command "apt-get update" on a server resulted in the reconfiguration of Apache and, therefore, is determined as the cause of the vulnerability.

Figure 5:
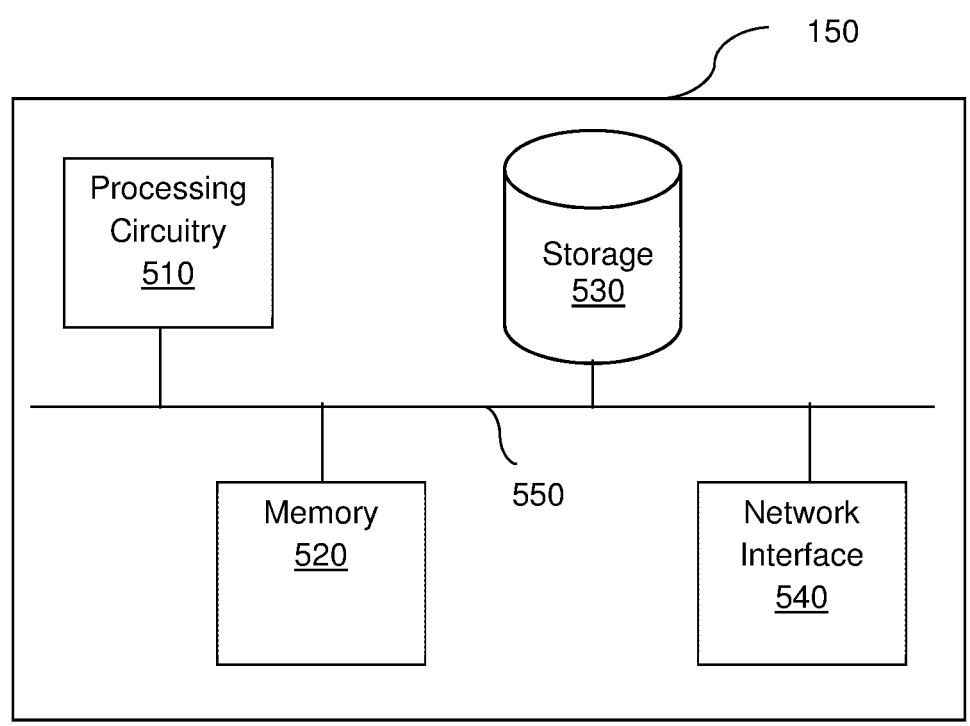
FIG. 5 is a schematic diagram illustrating a forensic data generator according to an embodiment.

FIG. 5 is an example schematic diagram of a forensic analyzer 150 according to an embodiment. The forensic analyzer 150 includes a processing circuitry 510 coupled to a memory 520, a storage 530, and a network interface 540. In an embodiment, the components of the forensic analyzer 150 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the forensic analyzer 150 to communicate with the server 140 for the purpose of collecting system change data, with the user device 120 for the purpose of collecting user activity data, or both. The network interface 540 may further the forensic analyzer 150 to communicate with the cybersecurity detection tools 130 for the purpose of collecting cybersecurity data.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
   detecting a vulnerability of a system;
   identifying a change to a first portion of the system, wherein the first portion of the system is related to the vulnerability;
   obtaining user activity data comprising data of user actions corresponding to discrete events initiated by a user, wherein the user actions are performed by the user with respect to the system;
   analyzing correlations between the user activity data and system change data, wherein the system change data comprise data collected from the system that indicate changes to the system;
   based on analyzing the correlations, determining that a first user action identified in the user activity data is correlated with the change to the first portion of the system, wherein the change occurred after the first user action; and
   determining, based on the correlation between the first user action and the change to the first portion of the system, that the first user action caused the vulnerability.

2. The method of claim 1, further comprising:
   determining at least one of a user that caused the vulnerability based on the user performing the first user action and a time period during which the vulnerability affected the first portion of the system based on a time of the first user action and a time of detection of the vulnerability.

3. The method of claim 1 further comprising tracking sequences of processes of the system and identifying the first user action as beginning a first of the sequences of processes.

4. The method of claim 1, wherein determining that the first user action is correlated with the change to the first portion of the system comprises determining that the first user action is correlated with the change based on the change occurring within a threshold period of time relative to the first user action or the change occurring prior to a next user action identified in the user activity data.

5. A non-transitory computer readable medium having stored thereon instructions for causing a processing circuitry to:
   detect a vulnerability of a system;
   identify a change to a first portion of the system, wherein the first portion of the system is related to the vulnerability;
   obtain user activity data comprising data of user actions corresponding to discrete events initiated by a user, wherein the user actions are performed by the user with respect to the system;
   analyzing correlations between the user activity data and system change data, wherein the system change data comprise data collected from the system that indicate changes to the system;
   based on the analysis of the correlations, determine that a first user action identified in the user activity data is correlated with the change to the first portion of the system, wherein the change occurred after the first user action; and
   determine, based on the correlation between the first user action and the change to the first portion of the system, that the first user action caused the vulnerability.

6. The non-transitory computer readable medium of claim 5, further comprising instructions to determine at least one of a user that caused the vulnerability and based on the user performing the first user action and a time period during which the vulnerability affected the first portion of the system based on a time of the first user action and a time of detection of the vulnerability.

7. The non-transitory computer readable medium of claim 5, wherein the instructions to determine that the first user action is correlated with the change to the first portion of the system comprise instructions to determine that the first user action is correlated with the change based on the change occurring within a threshold period of time relative to the first user action or the change occurring prior to a next user action identified in the user activity data.

8. A first system, comprising:
   a processing circuitry; and
   a memory, the memory containing instructions that, when executed by the processing circuitry, cause the first system to:
   detect a vulnerability of a second system;
   identify a change to a first portion of the second system, wherein the first portion of the second system is related to the vulnerability;
   obtain user activity data comprising data of user actions corresponding to discrete events initiated by a user, wherein the user actions are performed by the user with respect to the second system;

analyze correlations between the user activity data and system change data, wherein the system change data comprise data collected from the second system that indicate changes to the second system;

determine, based on the analysis of the correlations, that a first user action identified in the user activity data is correlated with the change to the first portion of the second system, wherein the change occurred after the first user action; and determine, based on the correlation between first user action and the change to the first portion of the second system, that the first user action caused the vulnerability.

9. The first system of claim 8, further comprising instructions that, when executed by the processing circuitry, cause the first system to:

determine at least one of a user that caused the vulnerability based on the user performing the first user action and a time period during which the vulnerability affected the first portion of the second system based on a time of the first user action and a time of detection of the vulnerability.

10. The first system of claim 8 further comprising instructions that, when executed by the processing circuitry, cause the first system to track sequences of processes of the second system and identify the first user action as beginning a first of the sequences of processes.

11. The first system of claim 8, wherein the instructions that, when executed by the processing circuitry, cause the first system to determine that the first user action is correlated with the change to the first portion of the second system comprise instructions that, when executed by the processing circuitry, cause the first system to determine that the first user action is correlated with the change based on the change occurring within a threshold period of time relative to the first user action or the change occurring prior to a next user action identified in the user activity data.

12. A method comprising:

installing a hook to a system that delays occurrence of a predefined set of user actions until a snapshot has been taken, wherein actions in the predefined set of user actions comprise those that cause changes to the system;

based on detecting an attempt by a user to perform a first user action in the predefined set of user actions that is caught by the hook, delay the first user action, wherein detection of the attempt to perform the first user action is based on the hook catching the first user action;

taking a first snapshot of a portion of the system while the first user action is delayed;

allowing the first user action to proceed after taking the first snapshot; and taking a second snapshot of the portion of the system after the first user action occurs.

13. The method of claim 12 further comprising, based on detecting an attempt by a user to perform a second user action that is not in the predefined set of user actions, allowing the second user action to occur without snapshotting.

14. The method of claim 12, wherein each user action indicated in the predefined set of user actions is a discrete user action that will cause a change to the system.

15. A non-transitory computer readable medium having stored thereon instructions for causing a processing circuitry to:

install a hook to a system that delays occurrence of a predefined set of user actions until a snapshot has been taken, wherein actions in the predefined set of user actions comprise those that cause changes to the system;

based on detection of an attempt by a user to perform a first user action in the predefined set of user actions that is caught by the hook, delay the first user action, wherein detection of the attempt to perform the first user action is based on the hook catching the first user action;

take a first snapshot of a portion of the system while the first user action is delayed;

allow the first user action to proceed after taking the first snapshot; and take a second snapshot of the portion of the system after the first user action occurs.

16. The non-transitory computer readable medium of claim 15, wherein each user action indicated in the predefined set of user actions is a discrete user action that will cause a change to the system.

17. The non-transitory computer readable medium of claim 15 further comprising instructions to, based on detection of an attempt by a user to perform a second user action that is not in the predefined set of user actions, allow the second user action to occur.

18. A first system comprising:

a processing circuitry; and a memory, the memory containing instructions that, when executed by the processing circuitry, cause the first system to:

install a hook to a second system that delays occurrence of a predefined set of user actions until a snapshot has been taken, wherein actions in the predefined set of user actions comprise those that cause changes to the second system;

based on detection of an attempt by a user to perform a first user action in the predefined set of user actions that is caught by the hook, delay the first user action, wherein detection of the attempt to perform the first user action is based on the hook catching the first user action;

take a first snapshot of a portion of the second system while the first user action is delayed;

allow the first user action to proceed after taking the first snapshot; and take a second snapshot of the portion of the second system after the first user action occurs.

19. The first system of claim 18, wherein each user action indicated in the predefined set of user actions is a discrete user action that will cause a change to the second system.

20. The first system of claim 18 further comprising instructions that, when executed by the processing circuitry, cause the first system to, based on detection of an attempt by a user to perform a second user action that is not in the predefined set of user actions, allow the second user action to occur.

* * * * *